US012766503B2

(12) United States Patent
Sun et al.

(10) Patent No.: US 12,766,503 B2
(45) Date of Patent: Oct. 20, 2026

(54) ANTI-CONTAMINATION TESTING DEVICE AND METHOD FOR RAPID TESTING OF NUCLEIC ACID AMPLIFICATION PRODUCT, AND USE THEREOF

(71) Applicant: JIANGSU MICRODING BIOMEDICINE TECHNOLOGY CO., LTD, Suzhou (CN)

(72) Inventors: Kemao Sun, Xuancheng (CN); Peng Gao, Xuancheng (CN); Xiangyun Qu, Suzhou (CN); Baoku Zhao, Xuancheng (CN)

(73) Assignee: JIANGSU MICRODING BIOMEDICINE TECHNOLOGY CO., LTD, Suzhou (CN)

( * ) Notice: Subject to any disclaimer, the term of this patent is extended or adjusted under 35 U.S.C. 154(b) by 848 days.

(21) Appl. No.: 18/011,317

(22) PCT Filed: Jun. 18, 2021

(86) PCT No.: PCT/CN2021/101063
§ 371 (c)(1),
(2) Date: Dec. 19, 2022

(87) PCT Pub. No.: WO2021/254505
PCT Pub. Date: Dec. 23, 2021

(65) Prior Publication Data

US 2023/0264189 A1 Aug. 24, 2023

(30) Foreign Application Priority Data

Jun. 19, 2020 (CN) ........................ 202010571470.9

(51) Int. Cl.
*B01L 3/00* (2006.01)

(52) U.S. Cl.
CPC ..... *B01L 3/5023* (2013.01); *B01L 2200/0689* (2013.01); *B01L 2200/16* (2013.01); *B01L 2300/042* (2013.01); *B01L 2300/044* (2013.01); *B01L 2300/0672* (2013.01); *B01L 2300/0825* (2013.01); *B01L 2300/12* (2013.01); *B01L 2400/0457* (2013.01)

(58) Field of Classification Search
None
See application file for complete search history.

*Primary Examiner* — Robert T. Crow
(74) *Attorney, Agent, or Firm* — MUNCY, GEISSLER, OLDS & LOWE, P.C.

(57) ABSTRACT

An anti-pollution test device and a method for rapid test of nucleic acid amplifications, and a use. The anti-pollution test device includes a test portion and a mixing reaction chamber, where the mixing reaction chamber includes: a reaction chamber body, a reaction chamber cover, a channel and a mixing reaction portion. The test portion includes a test inner core, a test kit, a transparent observation window, a flow guide device, and the flow guide device including: a flow guide tube and a flow guide component. One end of the flow guide component is connected to the flow guide tube, one end of the flow guide component is connected to the test inner core, to guide a mixed solution of a hybridization solution and a sample to the test inner core. The test inner core displays a final test result in an area corresponding to the transparent observation window.

11 Claims, 7 Drawing Sheets

ANTI-CONTAMINATION TESTING DEVICE AND METHOD FOR RAPID TESTING OF NUCLEIC ACID AMPLIFICATION PRODUCT, AND USE THEREOF

TECHNICAL FIELD

The present disclosure relates to the field of nucleic acid test, and in particular to an anti-pollution test device and method for rapid test of nucleic acid amplifications, and a use.

BACKGROUND ART

The novel coronavirus belongs to the β-genus of coronavirus, has envelopes, and particles that are round or oval, but are usually polymorphic, and have a diameter of 60 nm-140 nm, and has features obviously different from SARSr-CoV and MERSr-CoV. Current research shows that the homology between the novel coronavirus and bat-SL-CoVZC45 reaches 85% or above. On the basis of current epidemiological survey, the incubation period is 1 day-14 days, which is mostly 3 days-7 days. Clinical manifestations are mostly mild symptoms having fever, dry cough and fatigue as main manifestations. However, there are also severe patients who develop dyspnea and/or hypoxemia a week later, and critical severe patients can rapidly progress to acute respiratory distress syndrome, septic shock, metabolic acidosis that is difficult to correct, bleeding and coagulation disorders, and multiple organ failure. Therefore, early detection, early treatment and early isolation can effectively prevent the spread of diseases and reduce the proportion of the severe patients and the critical severe patients.

Nucleic acid extraction has become the most important and the most basic operation in molecular biology experimental technology. However, there are a large number of current extraction solutions of viral nucleic acids, of which complexity is different. Densely populated units at the grass-root level are often the starting point of outbreak of infectious diseases. It is extremely necessary to rapidly diagnose nucleic acids in situ, which is of great significance to prevention and control of the infectious diseases.

However, according to test level and treatment conditions in situ or at the grass-root level, it is urgent to develop a coronavirus disease 2019 nucleic acid rapid test product suitable for communities and personnel in-situ test, so as to alleviate test pressure of medical institutions in areas having severe epidemic situations, and reduce the risk of cross infection of examinees.

SUMMARY

In order to solve the problem of the prior art, on one hand, the present disclosure provides an anti-pollution test device for rapid test of nucleic acid amplifications. The anti-pollution test device includes a test portion and a mixing reaction chamber, where the mixing reaction chamber includes:

a reaction chamber body, a hybridization solution accommodating portion and a mixing reaction portion being arranged in the reaction chamber body, and the hybridization solution accommodating portion and the mixing reaction portion being provided with chambers for accommodating a hybridization solution and a sample to be tested respectively; and a reaction chamber cover, the reaction chamber cover being hermetically connected to and detachable from the reaction chamber body, a channel in communication with the hybridization solution accommodating portion and the mixing reaction portion being arranged between the reaction chamber cover and the reaction chamber body, the hybridization solution and the sample are subjected to a mixing reaction by means of the channel when the mixing reaction chamber containing the hybridization solution and the sample in an isolated manner is inversely placed, a flow guide port penetrating the reaction chamber cover being further provided on the reaction chamber cover, and a puncturable sealing cap being arranged on the flow guide port; and the test portion includes a test inner core and a test kit accommodating the test inner core, a transparent observation window being arranged on a position corresponding to a reaction area of the test inner core on the test kit, a flow guide device matching the mixing reaction chamber being further arranged on the test kit, and the flow guide device including:

a flow guide tube for puncturing the sealing cap and guiding a mixed solution of the hybridization solution and the sample after the mixing reaction onto a flow guide component; and the flow guide component, one end of the flow guide component being connected to the flow guide tube, one end of the flow guide component being connected to the test inner core, to guide the mixed solution of the hybridization solution and the sample to the test inner core, and the test inner core displaying a final test result in an area corresponding to the transparent observation window.

Further, the test kit includes an upper housing and a lower housing, the upper housing being hermetically connected to the lower housing, a test cavity accommodating the test inner core being formed between the upper housing and the lower housing, and the test inner core being arranged in the test cavity; and the flow guide device being arranged on an upper surface of the upper housing.

Further, the flow guide device further includes a fixed seat and a plug, the flow guide tube being mounted on the fixed seat and penetrating the fixed seat, a scratching flow guide hole being provided on the upper housing, the fixed seat being arranged in the scratching flow guide hole in a sleeving manner and being located outside the test kit, the plug being fixedly or detachably connected to the fixed seat from an inner side of the upper housing, to fixedly connect the flow guide tube to the upper housing, and one end of the flow guide component being mounted on the plug, and making contact with the flow guide tube.

Further, the flow guide component is a water-conducting fiber membrane, and the water-conducting fiber membrane extends from a lower end of the flow guide tube to the test inner core.

Further, the test inner core is a nucleic acid colloidal gold test strip.

Further, the flow guide device is further provided with a fully-closed or semi-closed annular mounting portion extending upwards from an outer surface of the upper housing, the annular mounting portion matches the mixing reaction chamber in overall dimensions, and the mixing reaction chamber is mounted in the annular mounting portion in a clamped manner.

Further, the scratching flow guide hole is provided on the upper housing, and is located on one side of the annular mounting portion close to the transparent observation window, a reaction portion fixing hole is provided on the upper housing and located on the other side of the annular mounting portion away from the transparent observation window, the mixing reaction portion extends outwards from a lower surface of the reaction chamber body, to form a reaction area protrusion in a protruding manner, and the reaction area protrusion matches the reaction portion fixing hole in size.

Further, the reaction area protrusion is a combination of a cylinder and a cone, and a cavity accommodating a liquid inside the reaction area protrusion is also a combination of a cylinder and a cone.

Further, the flow guide port is provided above the corresponding mixing reaction portion.

Further, the hybridization solution accommodating portion includes a detachable hybridization solution container, a partition is arranged inside the reaction chamber body, to partition the reaction chamber body into two chambers, one side is the mixing reaction portion accommodating the sample, and the other side is a hybridization solution container placement portion placing the hybridization solution container.

Further, the hybridization solution container is sealed in a pre-packaged manner, and an opening of the hybridization solution container is sealed with a removable sealing membrane.

The present disclosure further provides an anti-pollution test method for rapid test of nucleic acid amplifications. The anti-pollution test method uses the anti-pollution test device for rapid test of nucleic acid amplifications of any one of the above, and includes:

a) opening a reaction chamber cover, adding a hybridization solution into a hybridization solution accommodating portion, placing a polymerase chain reaction (PCR) probe into a mixing reaction portion, and then adding a sample to be tested into the mixing reaction portion;

b) applying the reaction chamber cover to isothermally amplify the sample to be tested in the mixing reaction portion; and c) then inversely placing and tilting a mixing reaction chamber to make both the hybridization solution and the sample flow, under gravity, into chambers of the mixing reaction portion corresponding to a flow guide port for a mixing reaction, inversely placing the mixing reaction chamber onto an upper housing after mixing, aligning the flow guide port to a flow guide tube, puncturing, by the flow guide tube, a sealing cap, guiding, by the flow guide tube, a mixed solution of the hybridization solution and the sample after the mixing reaction onto a flow guide component, guiding, by the flow guide component, the mixed solution of the hybridization solution and the sample to a test inner core, and displaying, by the test inner core, a final test result in an area corresponding to a transparent observation window.

Further, the anti-pollution test method further includes d) after test, discarding the whole anti-pollution test device for rapid test of nucleic acid amplifications in a safety place without disassembly.

The present disclosure further provides a use of the anti-pollution test device for rapid test of nucleic acid amplifications of any one of the above or an anti-pollution test method for rapid test of nucleic acid amplifications of any one of the above in food industry, agriculture, animal husbandry, customs quarantine, test of genetic mutations and identification of deoxyribonucleic acid (DNA) single nucleotide polymorphisms.

The present disclosure has the following beneficial effects:

1. the anti-pollution test device for rapid test of nucleic acid amplifications to which the present disclosure relates achieves outflow of a liquid in the mixing reaction chamber to the test inner core in a completely closed environment, and has the advantages of an excellent sealing effect and prevention of pollution of a primer aerosol;

2. the anti-pollution test device and method for rapid test of nucleic acid amplifications to which the present disclosure relates may prevent pollution during test due to excellent sealing performance, may achieve rapid real-time test according to test and treatment conditions in situ or at a grass-root level, and have convenient operation, simple use, and low specialization requirements; and 3. the anti-pollution test device and method for rapid test of nucleic acid amplifications, and the use to which the present disclosure relates have the advantages of providing coronavirus disease 2019 nucleic acid rapid test products suitable for communities and personal in-situ test, alleviating test pressure of medical institutions in areas having severe epidemic situations, and reducing the risk of cross infection of examinees.

BRIEF DESCRIPTION OF THE DRAWINGS

In order to describe the technical solutions in examples of the present disclosure more clearly, the accompanying drawings required for describing the examples are briefly introduced below. Obviously, the accompanying drawings in the following description are merely some examples of the present disclosure, and those of ordinary skill in the art would also be able to derive other accompanying drawings from these accompanying drawings without making creative efforts.

Figure 1:
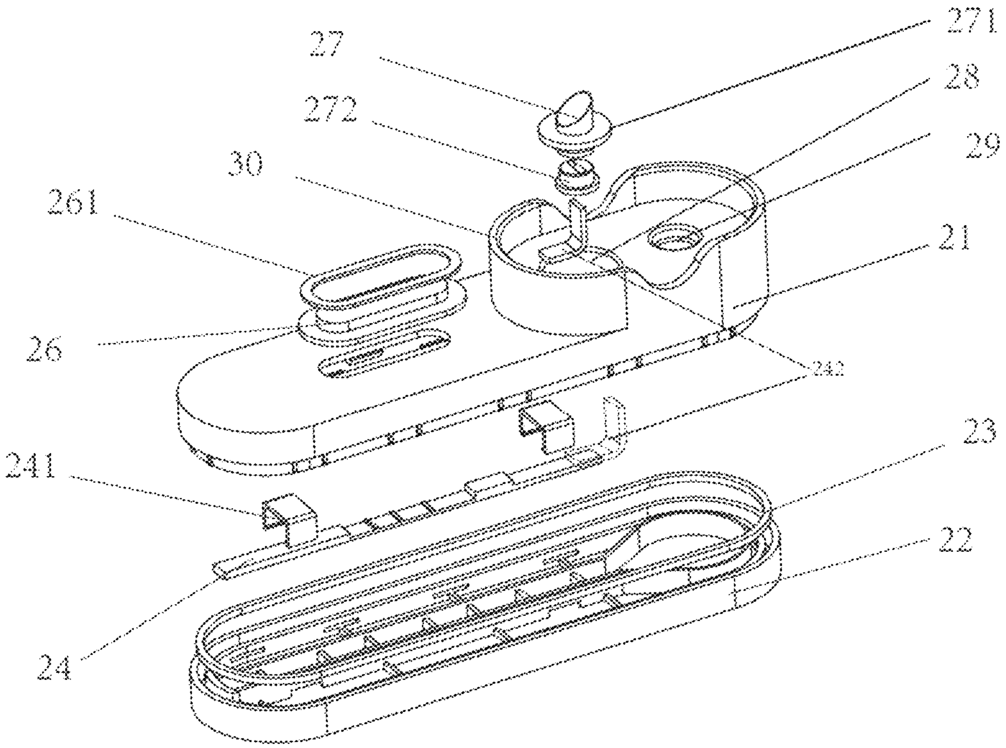
FIG. 1 is an exploded view of an example of a test portion of the present disclosure.
Figure 2:
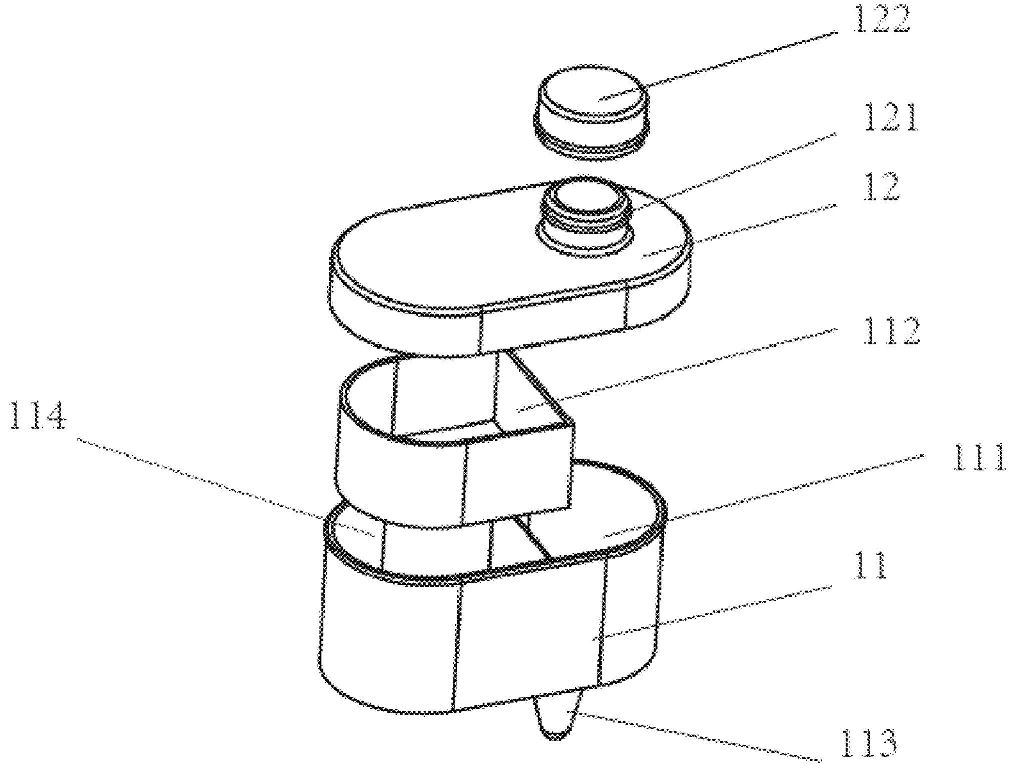
FIG. 2 is a schematic diagram of the mixing reaction chamber of the present disclosure during inverse placement.
Figure 3:
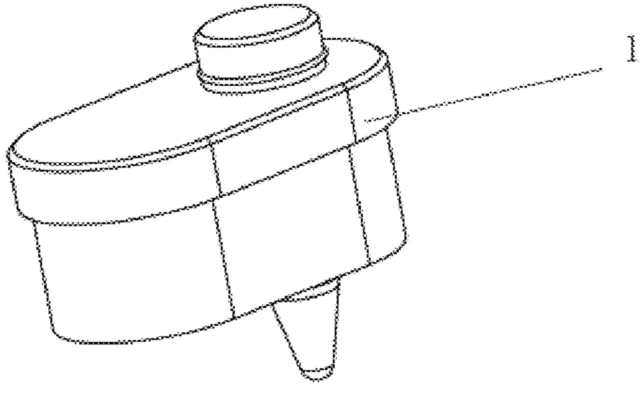
FIG. 3 is a schematic diagram of the mixing reaction chamber of the present disclosure during forward placement.
Figure 4:
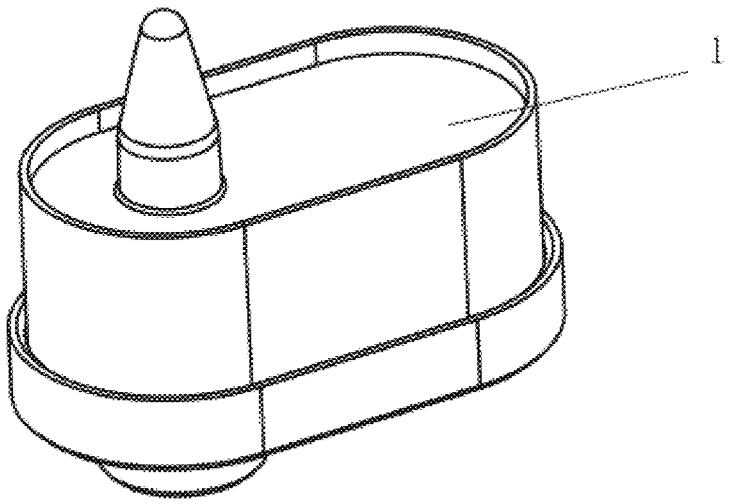
FIG. 4 is an exploded view of an example of an inverted mixing reaction chamber of the present disclosure.

Examples in the figures are represented as: mixing reaction chamber 1; reaction chamber body 11; reaction chamber cover 12; mixing reaction portion 111; hybridization solution container 112; reaction area protrusion 113; hybridization solution container placement portion 114; flow guide port 121; sealing cap 122; upper housing 21; lower housing 22; sealing ring 23; test inner core 24; fixing clip 241; flow guide component 242; transparent observation window 26;

observation window sealing card 261; flow guide tube 27; sample 4; metal bath device 5; hybridization solution 6; and protruding edge 7.

DETAILED DESCRIPTION OF THE EMBODIMENTS

In order to make the objectives, technical solutions and advantages of the present disclosure more clear, the technical solutions in examples of the present disclosure will be clearly and completely described below in conjunction with the accompanying drawings in the examples of the present disclosure, and obviously, the described examples are some examples rather than all examples of the present disclosure. All other examples obtained by those of ordinary skill in the art on the basis of the examples of the present disclosure without making creative efforts shall fall within the scope of protection of the present disclosure.

As shown in FIGS. 1-5, an anti-pollution test device for rapid test of nucleic acid amplifications. The anti-pollution test device includes a test portion and a mixing reaction chamber 1, where the mixing reaction chamber includes:

a reaction chamber body 11, a hybridization solution accommodating portion and a mixing reaction portion 111 being arranged in the reaction chamber body 11, and the hybridization solution accommodating portion and the mixing reaction portion 111 being provided with chambers for accommodating a hybridization solution and a sample to be tested respectively; and a reaction chamber cover 12, the reaction chamber cover 12 being hermetically connected to and detachable from the reaction chamber body 11, a channel in communication with the hybridization solution accommodating portion and the mixing reaction portion being arranged between the reaction chamber cover 12 and the reaction chamber body 11, the hybridization solution and the sample are subjected to a mixing reaction by means of the channel when the mixing reaction chamber 1 containing the hybridization solution and the sample in an isolated manner is inversely placed, a flow guide port 121 penetrating the reaction chamber cover being further provided on the reaction chamber cover 12, and a puncturable sealing cap 122 being arranged on the flow guide port 121; and the test portion includes a test inner core 24 and a test kit accommodating the test inner core 24, a transparent observation window 26 being arranged on a position corresponding to a reaction area of the test inner core on the test kit, a flow guide device matching the mixing reaction chamber being further arranged on the test kit, and the flow guide device including:

a flow guide tube 27 for puncturing the sealing cap 122 and guiding a mixed solution of the hybridization solution and the sample after the mixing reaction onto a flow guide component 242; and the flow guide component 242, one end of the flow guide component being connected to the flow guide tube 27, one end of the flow guide component being connected to the test inner core 24, to guide the mixed solution of the hybridization solution and the sample to the test inner core 24, and the test inner core 24 displaying a final test result in an area corresponding to the transparent observation window 26.

As shown in FIG. 1, in practical application, in order to facilitate production and assembly, the test kit includes an upper housing 21 and a lower housing 22, the upper housing 21 being hermetically connected to the lower housing 22. In an example of FIG. 1, a sealing ring 23 is arranged between the upper housing and the lower housing to achieve the effect of sealed connection. A test cavity accommodating the test inner core 24 is formed between the upper housing and the lower housing, and the test inner core 24 is arranged in the test cavity. In the example of FIG. 1, a plurality of supporting pieces protruding upwards and having an equal height are arranged on an inner bottom surface of the lower housing 22, the test inner core 24 is horizontally placed on the supporting pieces, and the test inner core 24 is fixed inside the lower housing 22 by means of a fixing clip 241. In the example in FIG. 1, the guide flow component 242 is L-shaped, a horizontal section of the guide flow component makes contact with a right end of the test inner core, a vertical section of the guide flow component makes contact with the flow guide tube 27, and the flow guide tube 27 is vertically arranged, such that the mixed solution of the hybridization solution and the sample is guided to the flow guide component 242 by gravity, and then is infiltrated and transmitted to the test inner core 24, and finally a test result is displayed on the test inner core 24 (which is usually displayed in a color band).

The flow guide device is arranged on an upper surface of the upper housing 21.

Figure 5:
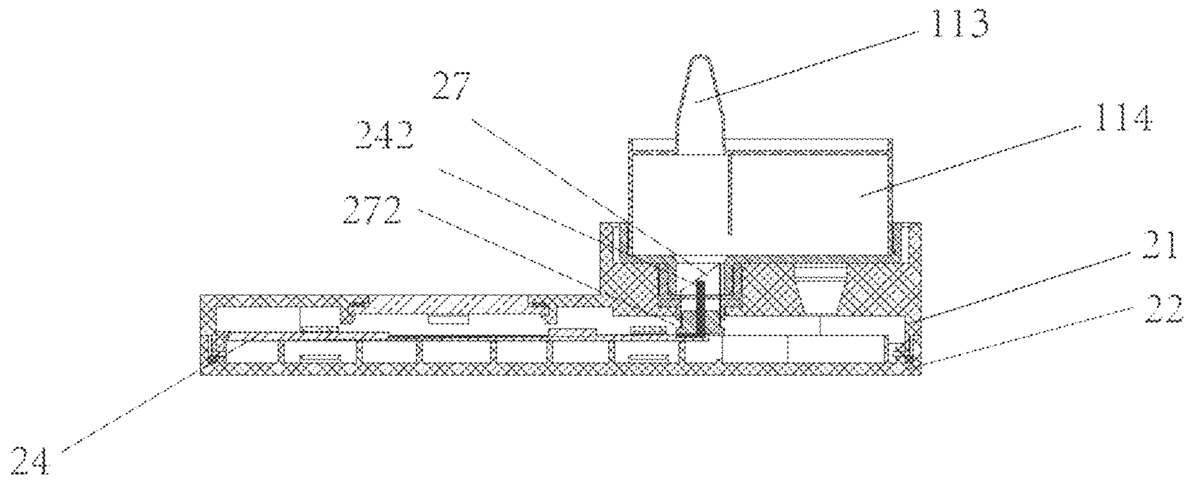
FIG. 5 is a schematic diagram of the present disclosure in a state of use.

As shown in FIGS. 1 and 5, the flow guide device further includes a fixed seat 271 and a plug 272, the flow guide tube 27 being mounted on the fixed seat 271 and penetrating the fixed seat 271, a scratching flow guide hole 28 being provided on the upper housing 21, the fixed seat 271 being arranged in the scratching flow guide hole 28 in a sleeving manner and being located outside the test kit, the plug 272 being fixedly or detachably connected to the fixed seat 271 from an inner side of the upper housing 21, to fixedly connect the flow guide tube 27 to the upper housing 21, and one end of the flow guide component 242 being mounted on the plug, and making contact with the flow guide tube 27.

In some examples, the flow guide component 242 is a water-conducting fiber membrane, and the water-conducting fiber membrane extends from a lower end of the flow guide tube to the test inner core. The flow guide component may also be made of other materials having excellent water conductivity to satisfy the requirement of guiding the mixed solution of the hybridization solution and the sample into the test inner core 24 to achieve the test purpose.

The test inner core 24 may be selected from a nucleic acid colloidal gold test strip.

In some examples, the flow guide device is further provided with a fully-closed or semi-closed annular mounting portion 30 extending upwards from an outer surface of the upper housing 21, the annular mounting portion 30 matches the mixing reaction chamber 1 in overall dimensions, and the mixing reaction chamber 1 is mounted in the annular mounting portion 30 in a clamped manner. The annular mounting portion 30 is arranged, such that the mixing reaction chamber 1 may be stably connected to the low guide device during flow guide test, so as to avoid external pollution caused by falling. Moreover, when a product is not in use, the mixing reaction chamber is connected to the flow guide device, so as to facilitate packaging, transportation and management, and avoid the trouble and cost increase in packaging, transportation and management caused by separation of the mixing reaction chamber and the flow guide device.

In examples of FIGS. 1, 5 and 9-12, the scratching flow guide hole 28 is provided on the upper housing 21, and is located on one side of the annular mounting portion 30 close to the transparent observation window 26, a reaction portion fixing hole 29 is provided on the upper housing 21 and located on the other side of the annular mounting portion 30 away from the transparent observation window 26, the mixing reaction portion 111 extends outwards from a lower surface of the reaction chamber body 11, to form a reaction area protrusion 113 in a protruding manner, and the reaction area protrusion 113 matches the reaction portion fixing hole 29 in size. Thus, during packaging and transportation in which the product is not in use, the mixing reaction chamber 1 is placed forwards to be clamped on the annular mounting portion 30, and the reaction area protrusion is just inserted into the reaction portion fixing hole 29. The purpose of providing the reaction portion fixing hole 29 is that after the sample is added, the sample may be immersed into a metal bath device separately for isothermal amplification, and the hybridization solution and the hybridization solution accommodating portion at which the hybridization solution is located may be maintained by an appropriate distance from the metal bath device, which not only satisfies test requirements, but also facilitates mixing reaction operation after completion of isothermal amplification.

In the examples of the figures, the reaction area protrusion 113 is a combination of a cylinder and a cone, and a cavity accommodating a liquid inside the reaction area protrusion is also a combination of a cylinder and a cone.

In a particular embodiment, the flow guide port 121 is provided above the corresponding mixing reaction portion 111.

In a preferred solution, the hybridization solution accommodating portion includes a detachable hybridization solution container 112, a partition is arranged inside the reaction chamber body, to partition the reaction chamber body into two chambers, one side is the mixing reaction portion 111 accommodating the sample, and the other side is a hybridization solution container placement portion 114 placing the hybridization solution container 112.

Figure 6:
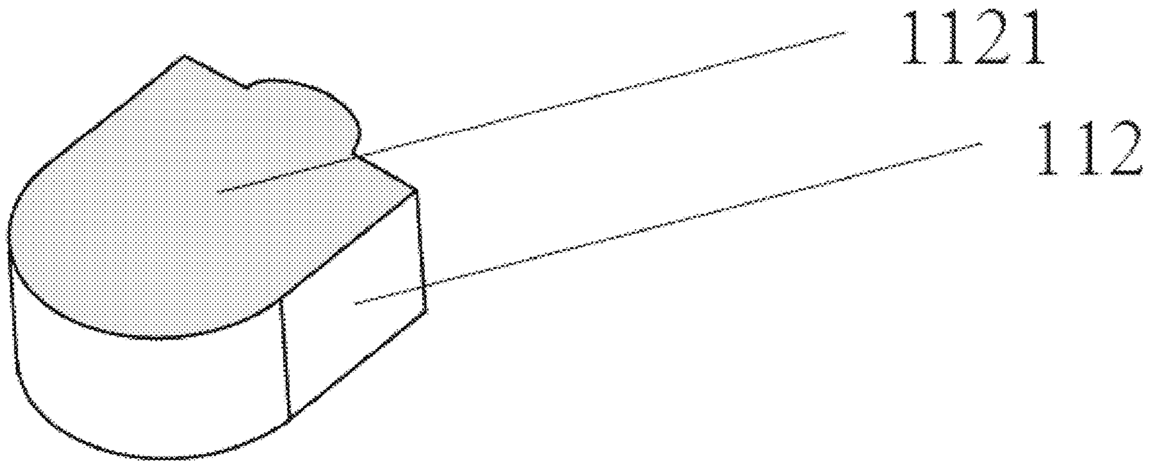
FIG. 6 is a schematic diagram of a hybridization solution container of the present disclosure.

Thus, the hybridization solution container 112 may be manufactured into a form of pre-packaging sealing, and an opening of the hybridization solution container is sealed with the removable sealing membrane 1121, which is as shown in FIG. 6. Thus, it may be ensured that the container containing the hybridization solution maintains necessary cleanliness before test, thereby ensuring accuracy of test.

Figure 7:
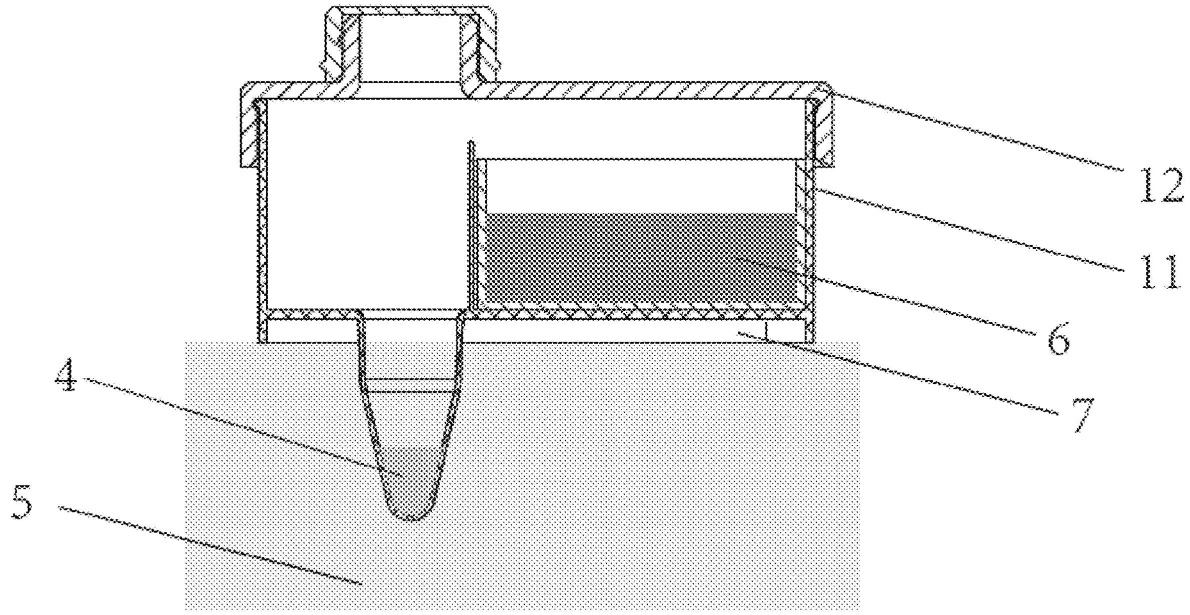
FIG. 7 is a schematic diagram of isothermal amplification of a sample after a hybridization solution and a sample are added into the mixing reaction chamber of the present disclosure.
Figure 8:
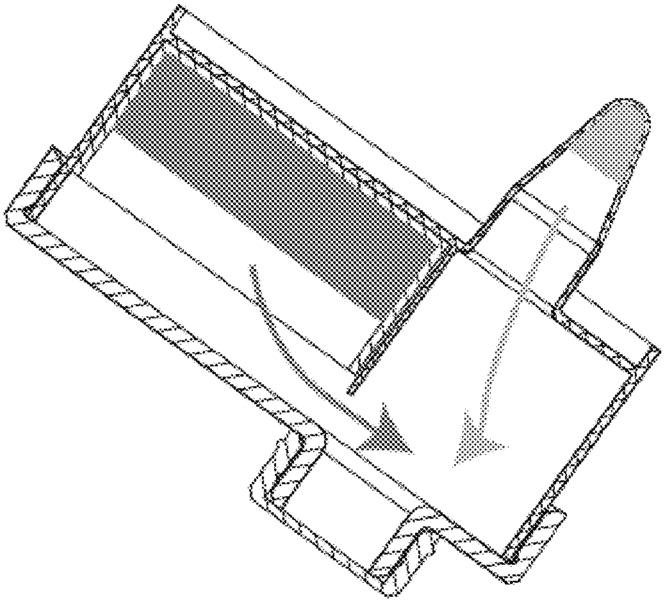
FIG. 8 is a schematic diagram of inversely placing the mixing reaction chamber to mix the hybridization solution and the sample after isothermal amplification of the present disclosure is completed.
Figure 9:
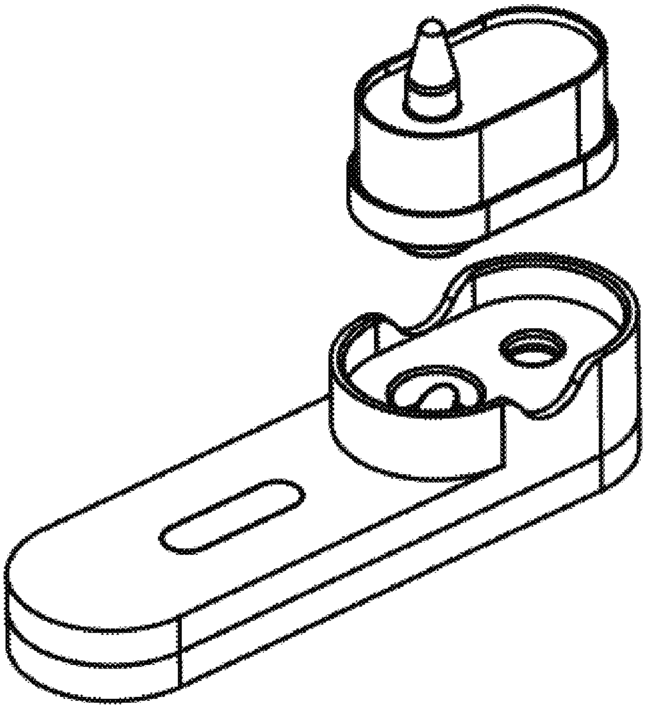
FIGS. 9 and 10 are schematic diagrams of clamping the inversely-placed mixing reaction chamber into a test portion for puncturing and flow guide to obtain a final result after a mixing reaction of the present disclosure is completed.
Figure 10:
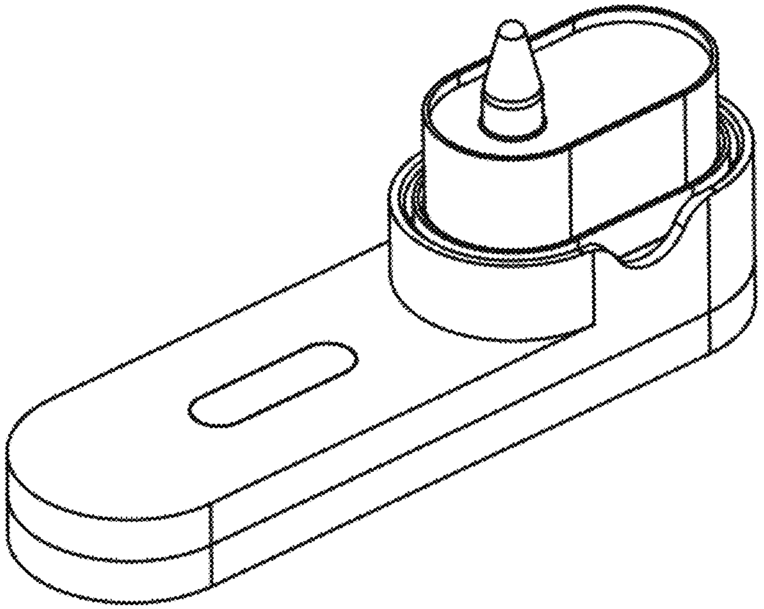
Figure 11:
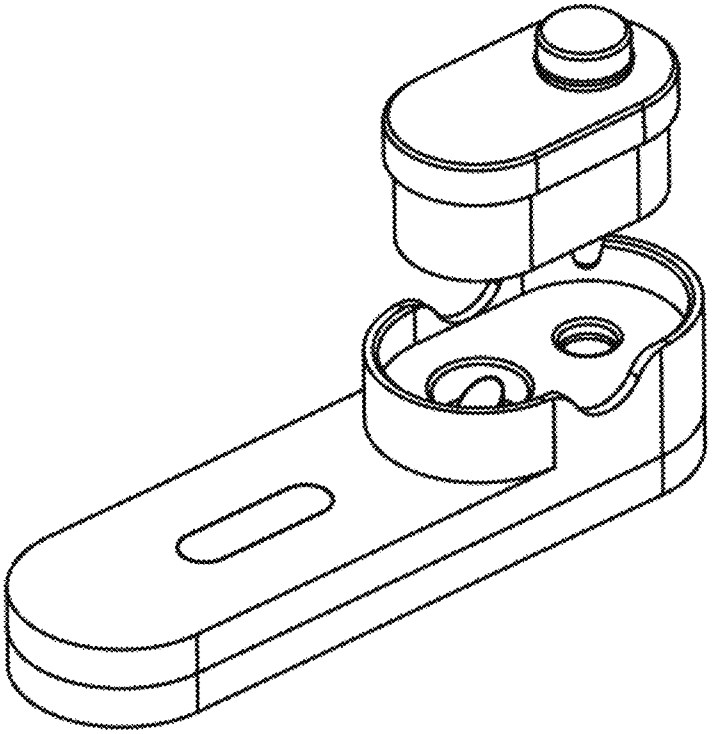
FIGS. 11 and 12 are schematic diagrams of clamping the mixing reaction chamber to the test portion in the present disclosure, so as to facilitate transportation.
Figure 12:
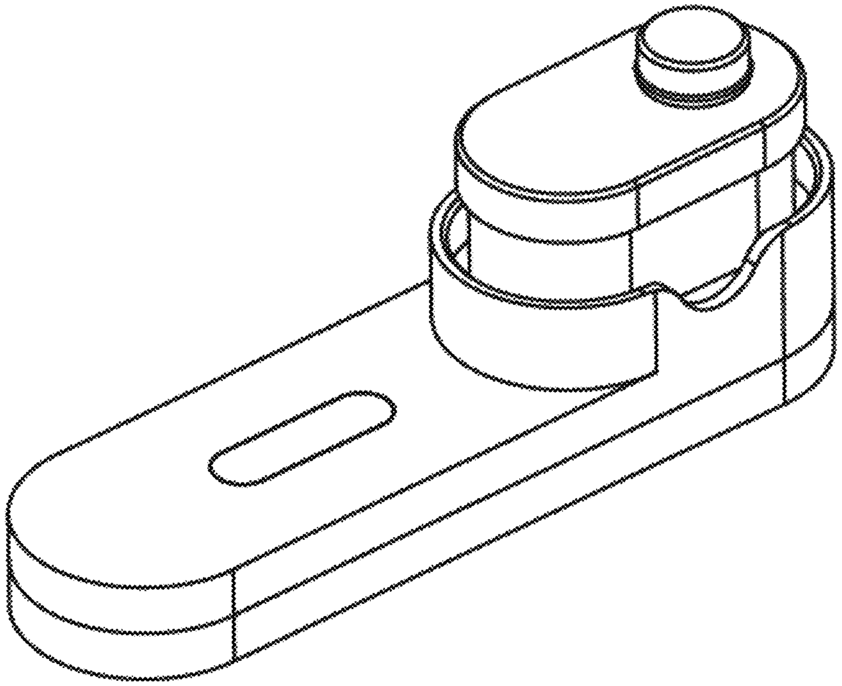

As shown in FIGS. 6-10, the present disclosure further provides an anti-pollution test method for rapid test of nucleic acid amplifications. The anti-pollution test method uses the anti-pollution test device for rapid test of nucleic acid amplifications of any one of the above, and includes:

a) open a reaction chamber cover 12, add a hybridization solution into a hybridization solution accommodating portion (more preferably, remove a sealing membrane 1121, and add a hybridization solution into a hybridization solution container 112 as shown in FIG. 6), place a polymerase chain reaction (PCR) probe into a mixing reaction portion 111, and then add a sample to be tested 4 into the mixing reaction portion 111 (in the examples shown in the figures, place the sample to be tested into a reaction area protrusion 113); and b) apply the reaction chamber cover 12 to isothermally amplify the sample to be tested in the mixing reaction portion. As shown in FIG. 7, the sample is immersed into the metal bath device 5 separately for isothermal amplification, and the hybridization solution 6 and the hybridization solution accommodating portion at which the hybridization solution is located may be maintained by an appropriate distance from the metal bath device 5, which not only satisfies detection requirements, but also facilitates mixing reaction operation after isothermal amplification. In FIG. 7, in order to ensure the safety distance, a ring of protruding edge 7 may be arranged at a bottom of the reaction chamber body 11.

c) as shown in FIG. 8, then inversely place and tilt a mixing reaction chamber 1 to make both the hybridization solution 6 and the sample 4 flow, under gravity, into chambers of the mixing reaction portion 111 corresponding to a flow guide port 121 for a mixing reaction, inversely place the mixing reaction chamber 1 onto an upper housing 21 after mixing, align the flow guide port 121 to a flow guide tube 27, puncture, by the flow guide tube 27, a sealing cap 122, guide, by the flow guide tube, a mixed solution of the hybridization solution 6 and the sample 4 after the mixing reaction onto a flow guide component 242, guide, by the flow guide component 242, the mixed solution of the hybridization solution 6 and the sample 4 to a test inner core 24, and display, by the test inner core 24, a final test result in an area corresponding to a transparent observation window 26.

Further, the anti-pollution test method further includes d) after test, discarding the whole anti-pollution test device for rapid test of nucleic acid amplifications in a safety place without disassembly.

The present disclosure further provides a use of the anti-pollution test device for rapid test of nucleic acid amplifications of any one of the above or an anti-pollution test method for rapid test of nucleic acid amplifications of any one of the above in food industry, agriculture, animal husbandry, customs quarantine, test of genetic mutations and identification of deoxyribonucleic acid (DNA) single nucleotide polymorphisms.

The present disclosure has the following beneficial effects:

1. the anti-pollution test device for rapid test of nucleic acid amplifications to which the present disclosure relates achieves outflow of a liquid in the mixing reaction chamber to a specified test card in a completely closed environment, and has the advantages of an excellent sealing effect and prevention of pollution of a primer aerosol;

2. the anti-pollution test device and method for rapid test of nucleic acid amplifications to which the present disclosure relates may prevent pollution during test due to excellent sealing performance, may achieve rapid real-time test according to test and treatment conditions in situ or at a grass-root level, and have convenient operation, simple use, and low specialization requirements; and 3. the anti-pollution test device and method for rapid test of nucleic acid amplifications, and the use to which the present disclosure relates have the advantages of providing coronavirus disease 2019 nucleic acid rapid test products suitable for communities and personal in-situ test, alleviating test pressure of medical institutions in areas having severe epidemic situations, and reducing the risk of cross infection of examinees.

Common pathogens include bacteria, fungi, viruses, mycoplasmas, chlamydia, parasites, etc.

The closed test device for nucleic acid amplifications may not only identify the pathogens, but also identify subtypes, virulent strains, mutant strains and drug resistance of the pathogens.

All the above optional technical solutions can use any combination to form optional examples of the present disclosure, which will not be repeated herein.

What are described above are merely preferred examples of the present disclosure, but not intended to limit the present disclosure, and any modifications, equivalent replacements, improvements, etc. made within the spirit and principles of the present disclosure should all fall within the scope of protection of the present disclosure.

What is claimed is:

1. An anti-pollution test device for test of nucleic acid amplifications, comprising:
- a test portion; and
- a mixing reaction chamber,
- wherein the mixing reaction chamber comprises:
  - a reaction chamber body, a hybridization solution accommodating portion and a mixing reaction portion being arranged in the reaction chamber body, and the hybridization solution accommodating portion and the mixing reaction portion being provided with chambers for accommodating a hybridization solution and a sample to be tested respectively; and
  - a reaction chamber cover, the reaction chamber cover being hermetically connected to and detachable from the reaction chamber body, a channel in communication with the hybridization solution accommodating portion and the mixing reaction portion being arranged between the reaction chamber cover and the reaction chamber body, the hybridization solution and the sample are subjected to a mixing reaction by means of the channel when the mixing reaction chamber containing the hybridization solution and the sample in an isolated manner is inversely placed, a flow guide port penetrating the reaction chamber cover being further provided on the reaction chamber cover, and a puncturable sealing cap being arranged on the flow guide port,; and
- wherein the test portion comprises a test inner core and a test kit accommodating the test inner core, a transparent observation window being arranged on a position corresponding to a reaction area of the test inner core on the test kit, a flow guide device matching the mixing reaction chamber being further arranged on the test kit, and the flow guide device comprising:
  - a flow guide tube for puncturing the sealing cap and guiding a mixed solution of the hybridization solution and the sample after the mixing reaction onto a flow guide component; and
  - the flow guide component, one end of the flow guide component being connected to the flow guide tube, one end of the flow guide component being connected to the test inner core, to guide the mixed solution of the hybridization solution and the sample to the test inner core, and the test inner core displaying a final test result in an area corresponding to the transparent observation window.

2. The anti-pollution test device for test of nucleic acid amplifications according to claim 1, wherein the test kit comprises an upper housing and a lower housing, the upper housing being hermetically connected to the lower housing, a test cavity accommodating the test inner core being formed between the upper housing and the lower housing, and the test inner core being arranged in the test cavity; and
- wherein the flow guide device being arranged on an upper surface of the upper housing.

3. The anti-pollution test device for test of nucleic acid amplifications according to claim 2, wherein the flow guide device further comprises a fixed seat and a plug, the flow guide tube being mounted on the fixed seat and penetrating the fixed seat, a scratching flow guide hole being provided on the upper housing, the fixed seat being arranged in the scratching flow guide hole in a sleeving manner and being located outside the test kit, the plug being fixedly or detachably connected to the fixed seat from an inner side of the upper housing, to fixedly connect the flow guide tube to the upper housing, and one end of the flow guide component being mounted on the plug, and making contact with the flow guide tube.

4. The anti-pollution test device for test of nucleic acid amplifications according to claim 3, wherein the flow guide component is a water-conducting fiber membrane, and the water-conducting fiber membrane extends from a lower end of the flow guide tube to the test inner core.

5. The anti-pollution test device for test of nucleic acid amplifications of claim 1, wherein the test inner core is a nucleic acid colloidal gold test strip.

6. The anti-pollution test device for test of nucleic acid amplifications according to claim 3, wherein the flow guide device is further provided with a fully-closed or semi-closed annular mounting portion extending upwards from an outer surface of the upper housing, the annular mounting portion matches the mixing reaction chamber in overall dimensions, and the mixing reaction chamber is mounted in the annular mounting portion in a clamped manner.

7. The anti-pollution test device for test of nucleic acid amplifications of claim 6, wherein the scratching flow guide hole is provided on the upper housing, and is located on one side of the annular mounting portion facing to the transparent observation window, a reaction portion fixing hole is provided on the upper housing and located on the other side of the annular mounting portion away from the transparent observation window, the mixing reaction portion extends outwards from a lower surface of the reaction chamber body, to form a reaction area protrusion in a protruding manner, and the reaction area protrusion matches the reaction portion fixing hole in size.

8. The anti-pollution test device for test of nucleic acid amplifications according to claim 7, wherein the reaction area protrusion is a combination of a cylinder and a cone, and a cavity accommodating a liquid inside the reaction area protrusion is also a combination of a cylinder and a cone.

9. The anti-pollution test device for test of nucleic acid amplifications according to claim 1, wherein the flow guide port is provided above the corresponding mixing reaction portion.

10. The anti-pollution test device for test of nucleic acid amplifications according to claim 1, wherein the hybridization solution accommodating portion comprises a detachable hybridization solution container, a partition is arranged inside the reaction chamber body, to partition the reaction chamber body into two chambers, one side is the mixing reaction portion accommodating the sample, and the other side is a hybridization solution container placement portion placing the hybridization solution container.

11. The anti-pollution test device for test of nucleic acid amplifications according to claim 10, wherein the hybridization solution container is sealed in a pre-packaged manner, and an opening of the hybridization solution container is sealed with a removable sealing membrane.

* * * * *